United States Patent
Chiu et al.

(10) Patent No.: US 8,208,800 B2
(45) Date of Patent: Jun. 26, 2012

(54) POTABLE WATER HEATING DEVICE

(76) Inventors: Hsien Mu Chiu, Taipei (TW); Chung Yuan Chen, Taipei (TW)

(*) Notice: Subject to any disclaimer, the term of this patent is extended or adjusted under 35 U.S.C. 154(b) by 772 days.

(21) Appl. No.: 12/382,370

(22) Filed: Mar. 16, 2009

(65) Prior Publication Data

US 2010/0232772 A1    Sep. 16, 2010

(51) Int. Cl.
    *F24H 1/18* (2006.01)
(52) U.S. Cl. .......................... 392/442; 99/282
(58) Field of Classification Search .......... None
    See application file for complete search history.

(56) References Cited

U.S. PATENT DOCUMENTS

| | | | |
|---|---|---|---|
| 3,034,417 A * | 5/1962 | Bunn | 99/283 |
| 3,220,334 A * | 11/1965 | Martin | 99/282 |
| 4,083,295 A * | 4/1978 | Hollingsworth | 99/283 |
| 4,138,936 A * | 2/1979 | Williams | 99/282 |
| 4,139,125 A * | 2/1979 | Arzberger et al. | 222/129.4 |
| 4,382,402 A * | 5/1983 | Alvarez | 99/295 |
| 4,448,113 A * | 5/1984 | Brabon | 99/290 |
| 4,641,011 A * | 2/1987 | Roberts | 392/451 |
| 4,745,852 A * | 5/1988 | Sager | 99/280 |
| 4,858,523 A * | 8/1989 | Helbling | 99/280 |
| 4,917,005 A * | 4/1990 | Knepler | 99/280 |
| 5,080,008 A * | 1/1992 | Helbling | 99/280 |
| 5,094,153 A * | 3/1992 | Helbling | 99/280 |
| 5,265,318 A * | 11/1993 | Shero | 29/447 |
| 5,283,854 A * | 2/1994 | Schiebelhuth | 392/467 |
| 5,671,325 A * | 9/1997 | Roberson | 392/442 |
| 5,782,163 A * | 7/1998 | Chang | 99/281 |
| 5,797,313 A * | 8/1998 | Rothley | 99/483 |
| 5,970,847 A * | 10/1999 | Saltzman | 99/287 |
| 6,067,894 A * | 5/2000 | Eugster | 99/285 |
| 6,246,831 B1 * | 6/2001 | Seitz et al. | 392/486 |
| 6,253,028 B1 * | 6/2001 | Roberson | 392/442 |
| 6,459,854 B1 * | 10/2002 | Yoakim et al. | 392/479 |
| 6,766,106 B2 * | 7/2004 | Roberson | 392/442 |
| 6,964,222 B1 * | 11/2005 | Tucker | 99/281 |
| 7,257,321 B2 * | 8/2007 | Kaastra | 392/459 |
| 7,756,404 B2 * | 7/2010 | Schubert et al. | 392/478 |
| 7,822,326 B2 * | 10/2010 | Commette et al. | 392/484 |
| 7,907,835 B2 * | 3/2011 | Boussemart et al. | 392/479 |
| 8,109,301 B1 * | 2/2012 | Denise | 141/360 |
| 2001/0012448 A1 * | 8/2001 | Roberson | 392/442 |
| 2002/0127005 A1 * | 9/2002 | Roberson | 392/442 |
| 2009/0178569 A1 * | 7/2009 | Tucker et al. | 99/282 |
| 2011/0095015 A1 * | 4/2011 | Kao | 219/433 |
| 2011/0100227 A1 * | 5/2011 | Boussemart et al. | 99/275 |
| 2011/0200726 A1 * | 8/2011 | Tinkler et al. | 426/431 |

FOREIGN PATENT DOCUMENTS

TW    M291506    6/2006

* cited by examiner

*Primary Examiner* — Thor Campbell (57) ABSTRACT

A rapid heating, highly efficient and reliable hot water drinking apparatus comprises: a water machine (1); a tank (2); a water boiler (3); a funnel (4); a liquid level switch (8); a salver (9); and a weight sensor mechanism (91). Said potable water heating device is characterized in that: three heating devices (31) are disposed inside said water boiler (3), said heating device (31) consists essentially of a hot-resistant chamber (32), whose one opening is connecting to the tank (2) and the other opening is connecting to the funnel (4); a cap (33) covering one opening of said chamber (32); a hyperthermal electric heating tube (34), disposed axially inside said chamber (32), whose one end is protruded through said cap (33); and a baffle (35), disposed helicoidally on the exterior of said heating tube (34).

6 Claims, 8 Drawing Sheets

POTABLE WATER HEATING DEVICE

FIELD OF THE INVENTION

The present invention is related to a potable water heating apparatus, providing hot potable water in a short period of time for hot beverages.

DESCRIPTION OF PRIOR ART

A potable water boiler is a common household appliance which can be found in most Asian families, especially in China, Hong Kong or Taiwan for their cultural habits. A potable water boiler is ideally for making hot beverages in a short period. A user places a tea bag, instant coffee or chocolate powder in a vessel under the hot water spout of a potable water boiler then presses the button to have a hot tea, coffee or chocolate, sometimes is as good as to make cup noodles. A potable water boiler can provide hot water at any time, saving gas for heating a filled teapot just for a cup of tea and shortening the time for boiling the water.

A conventional water heating machine usually consists an electrical heating means, two separate water reservoirs for restoring hot and cold water. The user pours cold water into the cold water tank, utilizing said heating means to heat up the cold water to the boiling point, and then restoring the hot water in the hot water reservoir. A smaller appearance comparing with others household appliance such as refrigerator misleads us to believe that the potable water boiler consumes less electricity; however, heat preserving requires said high-power electrical heating means being constantly activated to reheat the water, wasting energy unnecessarily. An average power consumption of a water heating machine for maintaining the water temperature for twenty-four hours is in a range of 1.8~3 KWH, 54~90 KWH per month which consumes more power than a refrigerator.

In the cited reference TW M291506, entitled "An Energy-Saving Water Boiler", the independent claim 1 thereof is translated in English as following (References numbers are added by the applicants according the drawings for better description of the cited reference):

"An energy-saving water boiler consists essentially of:

A heat-exchanging means (10) which comprising one first water inlet (101), one second water inlet (103), one first water outlet (102) and one second water outlet (104); said first water inlet (101) is utilized for leading in unboiled water and connected to said first water outlet (102); and said second water inlet (103) is connected to said second water outlet (104);

A pre-heat chamber (20), engaged with the first water outlet (102) of said heat-exchanging means (10);

A hot water chamber (30), engaged with said pre-heat chamber (20) to heat up the cool water and leads the hot water into a hot water outlet (51) and said second water inlet (103) to produce heat transfer with cool water; and A warm water reservoir (40), connected to the second water outlet (104) of said heat-exchanging means (10) to maintain the hot water in a required temperature after heat-exchange, and leads out the water to a warm water outlet (52) and said hot water chamber (30)."

Said cited reference discloses an improved water boiler, utilizing a high power heating means to heat up the cool water and restoring the warm water in a warm water reservoir, the temperature of the warm water is maintained by a low power heating means. When hot water is needed, warm water in the warm water reservoir is circulated into the hot water chamber to be reheated by said high power heating means. Since the water is warm, it decreases the power consumption. However, the water boiler of the cited reference still possesses following defects:

1. Reheating the warm water by the high power heating means may lowers the power consumption, however, the low power heating means is still generating unnecessary power consumption. Therefore, to cut out the power consumption for heat preserving, maximizing the efficiency of the heating apparatus becomes the primary objective of the present invention.
2. The heating time is extended by the inefficient high power heating means, reducing the efficiency of the apparatus. Therefore, to reduce the heating time and improve the efficiency of the apparatus become the secondary objective of the present invention.

SUMMARY OF THE INVENTION

The present invention is to provide a fast heating and safe potable water heating device without power consumption for heat preserving.

A potable water heating device comprises:

A water machine (1); a tank (2) formed in the left side of said water machine (1); a water boiler (3) coupled with the bottom of said water machine (1); a funnel (4) disposed on the right side of the top of said water machine (1); a liquid level switch (8) installed on the inner side of said tank (2); a salver (9) disposed on the right side of the bottom of said water machine and under said funnel (4); and a weight sensor mechanism (91) set in the inner bottom of said salver (9).

Said potable water heating device is characterized in that: three heating devices (31) disposed inside said water boiler (3), each of said heating device (31) consists essentially of a hot-resistant chamber (32) which one opening is connecting to the tank (2) and the other opening is connecting to the funnel (4). Said chamber (32) is covered with a thermal insulation (5) and a cap (33) covers one opening of said chamber (32). A hyperthermal electrical heating tube (34) is disposed axially inside said chamber (32) where one end is protruded through said cap (33); and a baffle (35) disposed helically coiled on the exterior of said heating tube (34).

The weight sensor mechanism (91) of the present invention includes a second switch (911) to switch on the heating mechanism of said boiler (3); a third switch (912) to switch off the heating mechanism of said boiler (3). A support (92) is disposed on the bottom of said salver (9). At least two springs (93) is engaged with said support (92) to retract the salver (9) to its original position. A first projection part (94) is disposed on one side of said support (92) to control the function of said second switch (911); a second projection part (95) is disposed on the same side of the first projection part (92) to control the function of the third switch (912); and a self-restoring lever bar (96) is controlled by the first projection part (94) to switch on/off said second switch (911).

The weight sensor mechanism (91) of the present invention further comprises a pressure switch for monitoring the alteration of load; and a control device which consists essentially of a data decision IC.

The chamber (32) as disclosed above is connected to said tank (2) by a water inlet (321) and connected to said funnel (4) by a water outlet (322); a check valve (7) is incorporated between said water inlet (321) and the tank (2) to prevent hot water flow-back; and a hot water guide pipe (6) having inverted L shape is installed to connect said water outlet (322) and said funnel (4).

The liquid level switch (8) consists essentially of a floating device (81); a first switch (82), controlled by said liquid level switch (8) to switch on/off said heating device (31); a wall (83) is to separate said floating device (81) and the tank (2); and a hole (84), disposed on the bottom of said wall (83) to lead in the water of the tank (2).

Said floating device (81) includes a float ball (811) with ballast, disposed inside of said wall (83); a float arm (812) located on the upper portion of the water machine (1) to switch on/off said first switch (82); and a cable (813) to connect said float ball (811) and float arm (812).

Said liquid level switch (8) is a switch which monitors the height of the water surface to switch on/off said heating device (31) when the water level reaches to an adequate range.

A left cover (11) is set on the top of said water machine (1) to seal the left side thereof and a right cover (12) is set next to said left cover (11) to seal the tank (2); pluralities of fixing elements (111) are installed on the bottom of said left cover (11) for securing said left cover (11) on top of the water machine (1).

COMPARISON WITH THE PRIOR ART

The present invention possesses following advantages:
1. The baffle (35) disposed on the exterior of said hyperthermal electric heating tube (34) forcing the water that flows in the water boiler (3), circulates the said hyperthermal electric heating tube (34) in a helical fashion which improved the heating efficiency, heating cool water to boiling point within few seconds, being energy-saving.
2. The weight sensor mechanism (91) can keep the heating device (31) being switched-off when no load is presented; and only be switched on when a vessel is placed by the user. The present invention removes the heat preserving mechanism, saving the power consumption for reheating water constantly, improving the energy efficiency; and the liquid level switch (8) avoids the damage of the hyperthermal electric heating tube (34) caused by overheating when no water is circulated inside the heating device (31).
3. The check valve (7) incorporated between the water inlet (321) and the tank (2) allows the hot water can only move toward one direction, more precisely, toward the funnel (4). The check valve (7) prevents any hot water mixing with the unboiled cool water which will reduce the temperature of the hot water; and the installation of the guide pipe (6), whose hot water exit is higher than the unboiled water surface. Both the check valve (7) and guide pipe (6) ensure the water releases from hot water spout (41) approximates the boiling point.
4. Three heating devices (31) installed in the present invention providing hot water reciprocally, shorten the time for heating and water supplying. The concept of said heating devices (31) allows the present invention to supply hot water without a hot water reservoir.

DETAIL DESCRIPTION OF THE PREFERRED EMBODIMENT OF THE PRESENT INVENTION

The description of the preferred embodiment of the present invention is described in detail according to the appended drawings hereinafter.

Figure 1:
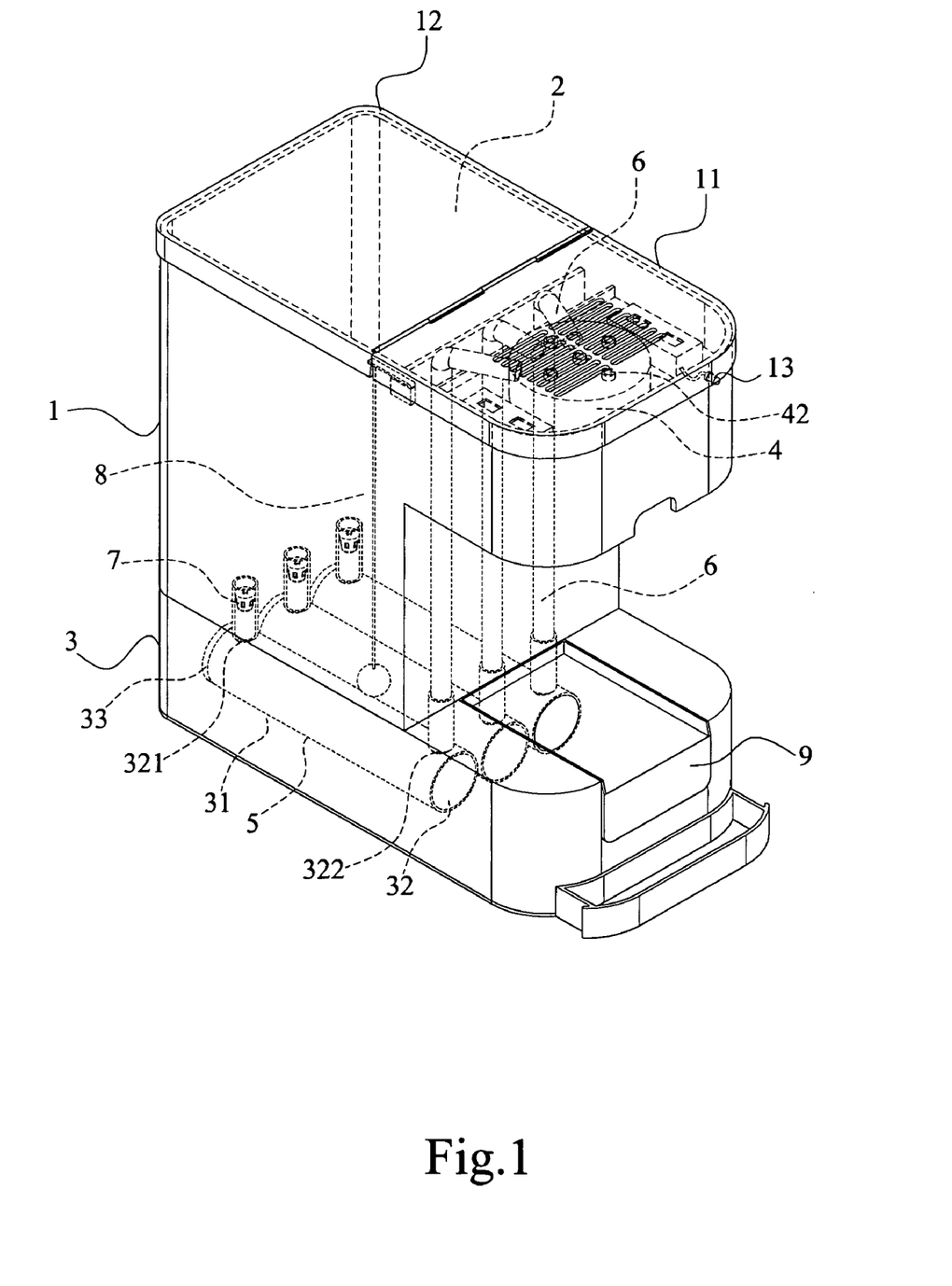
FIG. 1 is a schematic view of the present invention.
Figure 2:
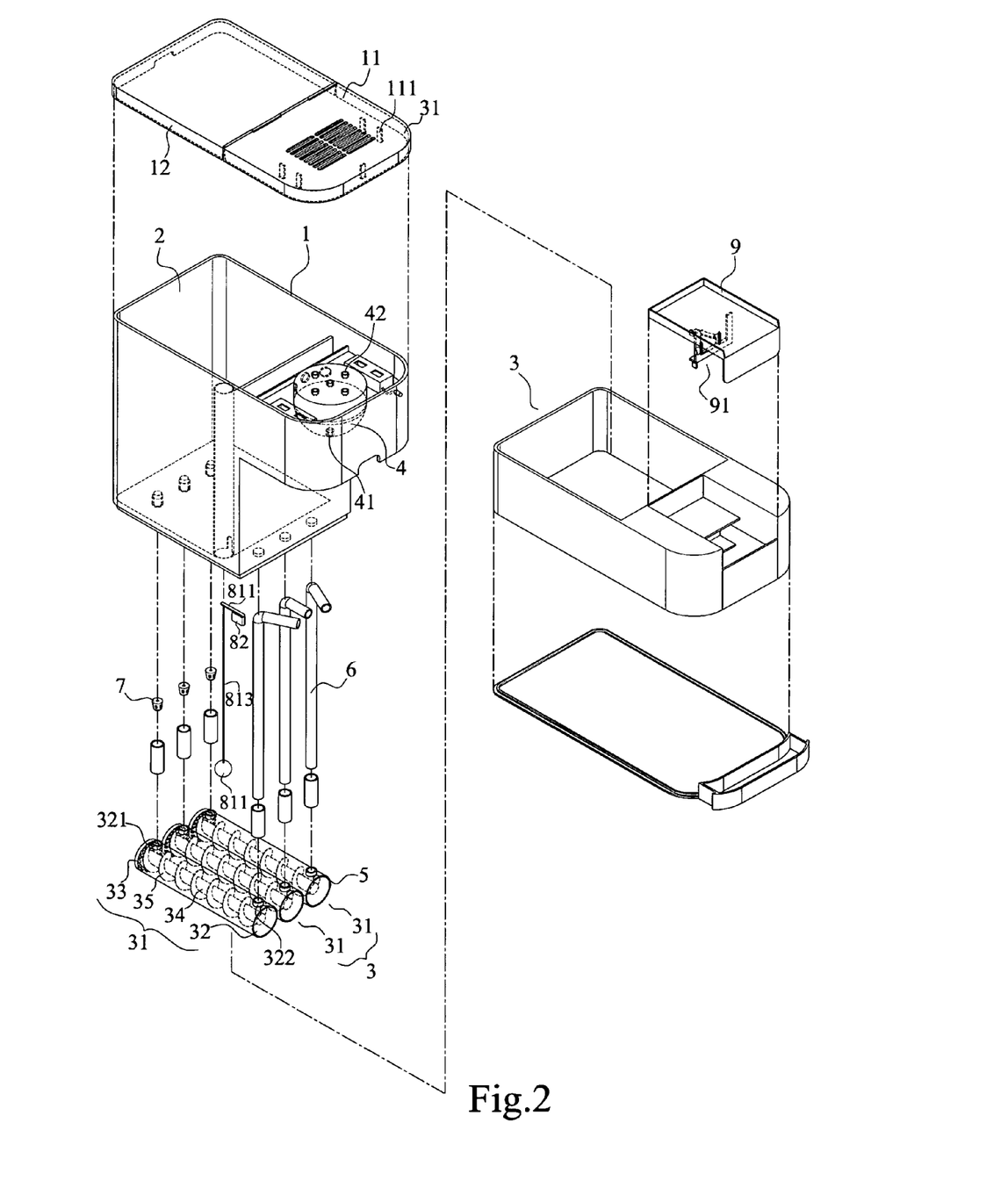
FIG. 2 is an exploded view of the present invention.
Figure 3:
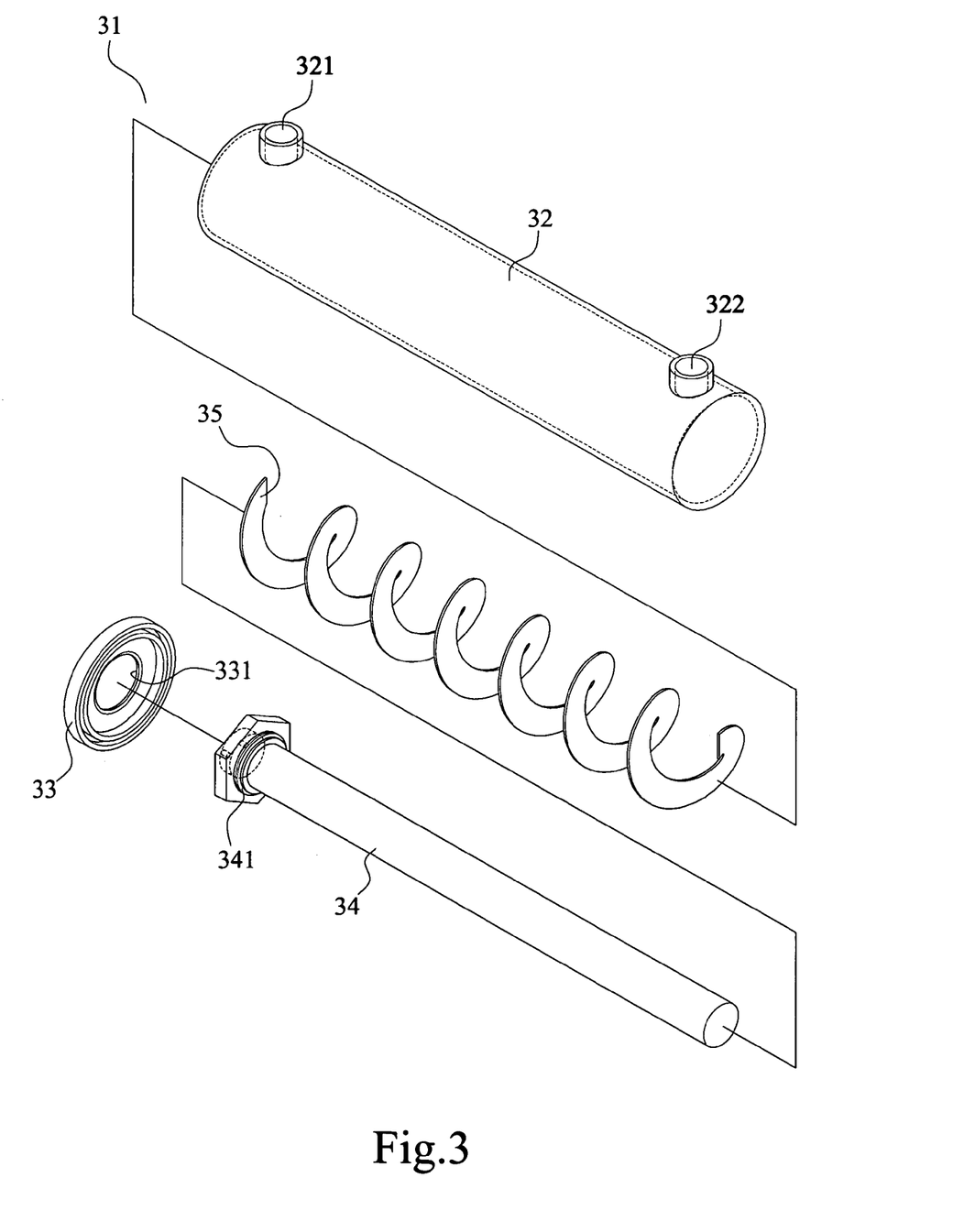
FIG. 3 is an exploded view of the heating device of the present invention.
Figure 4:
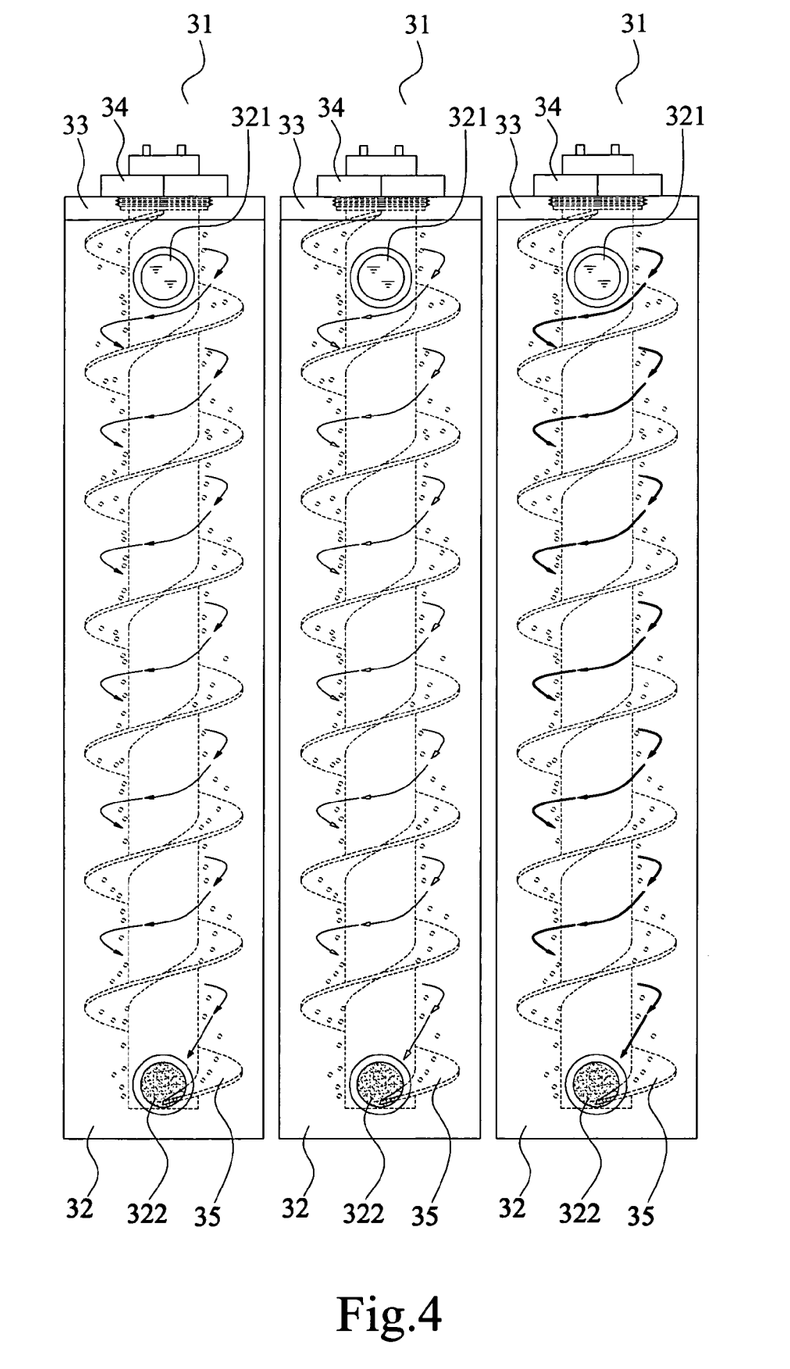
FIG. 4 is a schematic view of the present invention in operation.

FIG. 1 is a schematic view of the present invention; FIG. 2 is an exploded view of the present invention; FIG. 3 is an exploded view of the heating device of the present invention; and FIG. 4 is a schematic view of the present invention in operation.

As illustrated in FIGS. 1~4, a potable water heating device comprising: a water machine (1); a tank (2) formed in the left side of said water machine (1); a water boiler (3) affixed with the bottom of said water machine (1); a funnel (4) disposed on the right side of the top of said water machine (1); a liquid level switch (8) installed on the inner side of said tank (2); a salver (9) disposed on the right side of said water machine (1) under said funnel (4); and a weight sensor mechanism (91) is located under said salver (9).

Said potable water heating device is characterized in that: three heating devices (31) disposed inside said water boiler (3); since said three heating devices (31) are identical, only function of one will be described hereafter. Said heating device (31) consists essentially of a hot-resistant chamber (32) which one opening is connecting to the tank (2) and the other opening is connecting to the funnel (4); a cap (33) covering one opening of said chamber (32); a hyperthermal electric heating tube (34) is disposed axially inside said chamber (32) whose one end is protruded through said cap (33); and a helicoidal baffle (35) disposed on the exterior of said heating tube (34).

The heating device (31) is the major improvement of the present invention. Said heating tube (34) located inside the heating device (31) having a screw thread (341) disposed on the exterior of one end thereof. Said thread (341) is paired with a thread of a nut hole (331) set in the centre of the cap (33), affixing the heating tube (34) to the cap (33) and the heating device (31). With the baffle (35) disposed on the exterior of the heating tube (34), water in the chamber (32) will coil the heating tube (34) while circulating therein, extending the circulating time inside the heating tube (34); further, high thermal conduction of the baffle (35) expands heat exchanging area, making the water approximate the boiling point within ten seconds, improving the heating efficiency and minimizing the energy consumption.

As showing in FIG. 4, three heating devices (31) can provide hot water reciprocally, allowing the present invention supply hot water instantly without a hot water reservoir as conventional concept.

A heat preserving element (5), made of heat isolative material, is covered on the exterior of the chamber (32) to preserves the heat generated by the heating device (31) inside the chamber (32) to minimize the heat losses.

The weight sensor mechanism (91) aforementioned includes a second switch (911) to switch on the heating mechanism of said water boiler (3) and initiate hot water supply; a third switch (912) to switch off the heating mechanism of said boiler (3) and terminate hot water supply; a support (92) is disposed under said salver (9); at least two springs (93)

engaged with said support (92) to retract the salver (9) to its original position; a first projection part (94) disposed on one side of said support (92) to control the function of said second switch (911); a second projection part (95) disposed on the same side of said first projection part (92) to control the function of said third switch (912); and a self-restoring lever bar (96), intrigued by said first projection part (94) to switch on/off said second switch (911).

Said weight sensor mechanism (91) is another improving feature of the present invention. The heating device (31) will be switched on only when a load (i.e. a cup, a coffee mug or other vessel) is placed on the salver (9) to provide sufficient weight for activating the weight sensor mechanism (91) and deactivating when the liquid inside the vessel reaches its maximum volume. The weight sensor mechanism (91) provides the present invention with features of automatic hot water supply and energy-saving.

Another type of the weight sensor mechanism (91) comprises a pressure switch for monitoring the alteration of the load and a data decision IC (both not shown). Said electronic weight sensor mechanism (91) improves the perception of the sensor, makes the present invention suitable for higher or heavier vessel.

The liquid level switch (8) of the present invention comprises a floating device (81); a first switch (82), controlled by said liquid level switch (8) to switch on/off said heating device (31); a hollow wall (83) located inside the tank (2) to separate said floating device (81) and the tank (2); and a hole (84), disposed on the bottom of said wall (83) to lead the water into the tank (2).

The liquid level switch (8) is the other improvement of the present invention. Said liquid level switch (8) is located inside the hollow wall (83), since the liquid inside the wall (83) and the tank (2) circulate by a passage, the wall (83) and the tank (2) form a communicating vessel, therefore, the liquid level of the wall (83) and the tank (2) will be equal. The liquid level switch (8) can only be switched on when water is filled inside the wall (83). This concept can avoid the damage caused by overheating the heating device (31) when the tank (2) is empty.

Said floating device (81) consists a float ball (811) with ballast, disposed inside said wall (83); a float arm (812), disposed on the upper area of the water machine (1), to switch on/off said first switch (82); and a cable (813) to connect said float ball (811) and said float arm (812). The simple and similar mechanism as the flush toilet makes the liquid level switch (8) reliable and easy repaired for the user.

A more accurate electrical liquid level switch (8) can also be utilized in the present invention. Said liquid level switch (8) comprises an electrical switch to monitor the liquid level and switch on the heating device (31) when adequate range is reached. The detailed function of said switch is not described in the present embodiment.

Said chamber (32) connects to the tank (2) by a water inlet (321) and to the funnel (4) by a water outlet (322). A check valve (7) is incorporated between said water inlet (321) and the tank (2) to avoid hot water flowing back to the tank (2); and a hot water guide pipe (6) having inverted "L" shape, is installed between said water outlet (322) and said funnel (4). When cool water flows into the heating device (31), the water is heated and compressed towards both ends of said chamber (32), said check valve (7) can seal the passage of the water inlet (321); and forces the hot water toward said hot water guide pipe (6). In accordance with the theory of siphon, an exit of the guide pipe (6) is located higher than the liquid surface of the tank (2) to ensure that only water which exceeds the boiling point can circulate through the guide pipe (6) into the funnel (4).

A left cover (11) is set on the top of said water machine (1) to seal the left side thereof, and a right cover (12) is set next to said left cover (11) to seal the tank (2); pluralities of fixing elements (111) are installed on the bottom of said left cover (11) for affixing said left cover (11) on top of the water machine (1). User can refill the tank (2) by opening the right cover (12) only, since the left cover (11) is affixed to the water machine (1) by said fixing elements (111), the user won't be harmed by a hot cover as some of prior arts.

Figure 5:
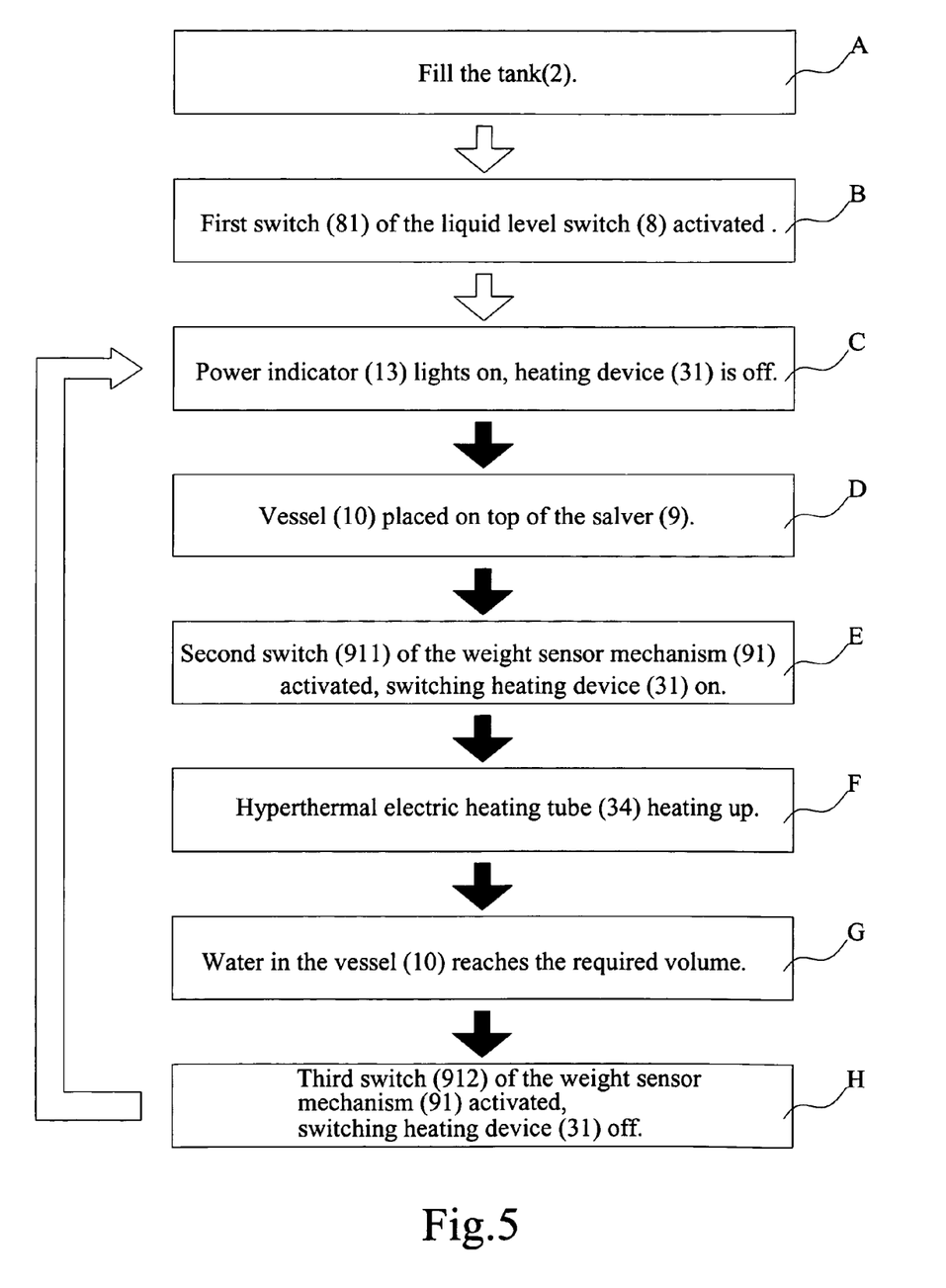
FIG. 5 is a flow chart of the present invention.
Figure 6:
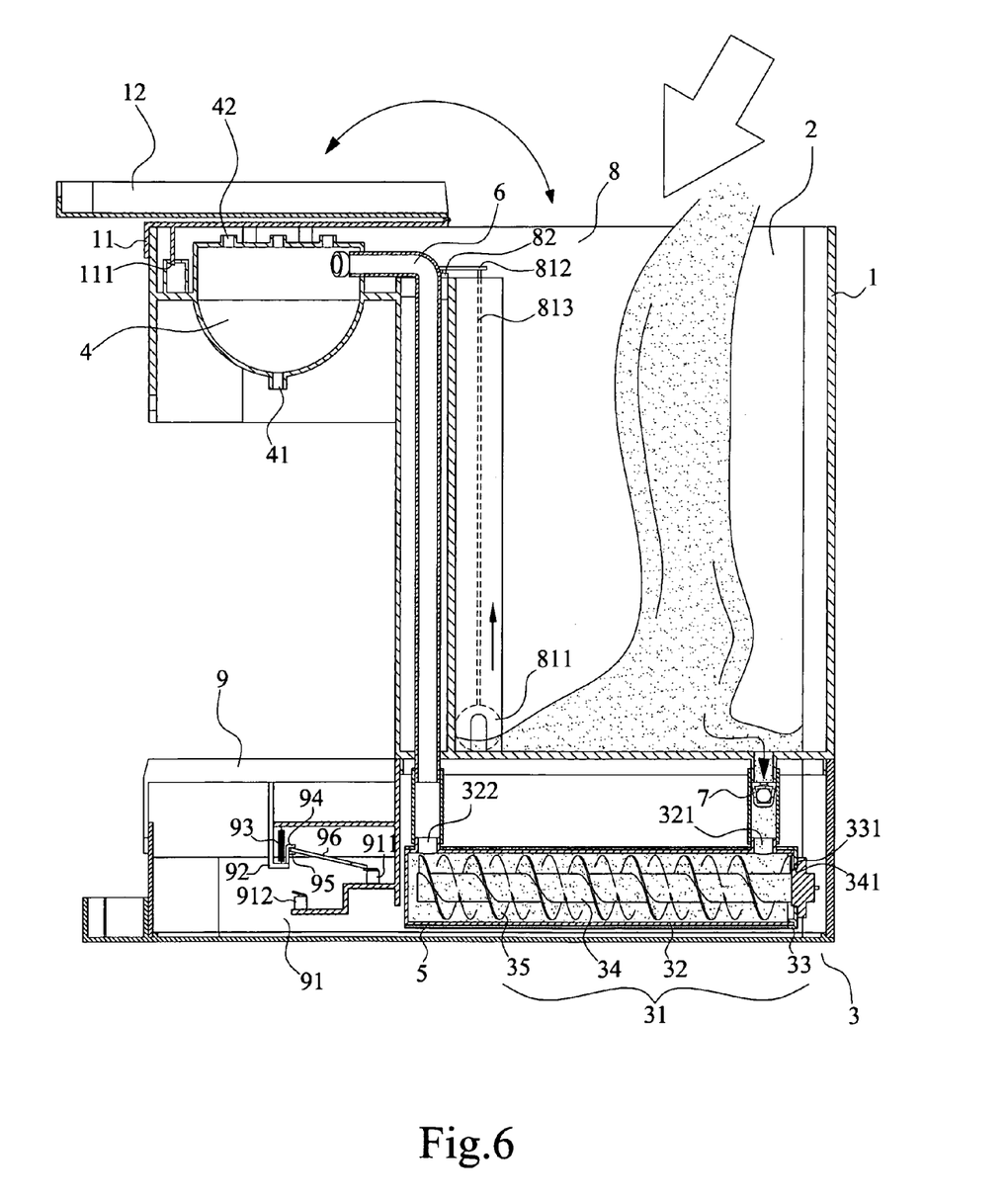
FIG. 6 is a schematic view of the preferred embodiment of the present invention before the heating procedure.
Figure 7:
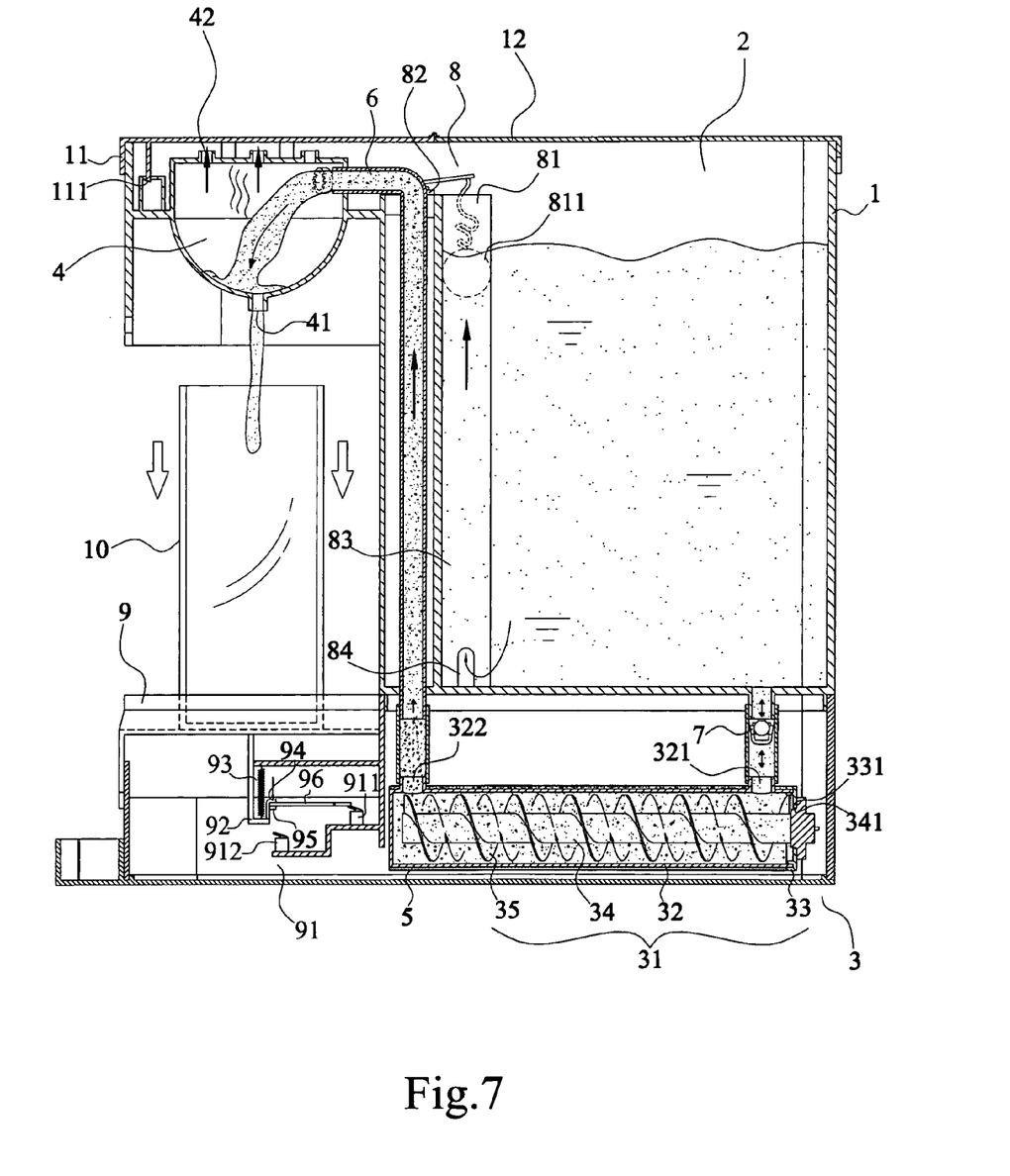
FIG. 7 is a schematic view of the preferred embodiment of the present invention during the heating procedure.
Figure 8:
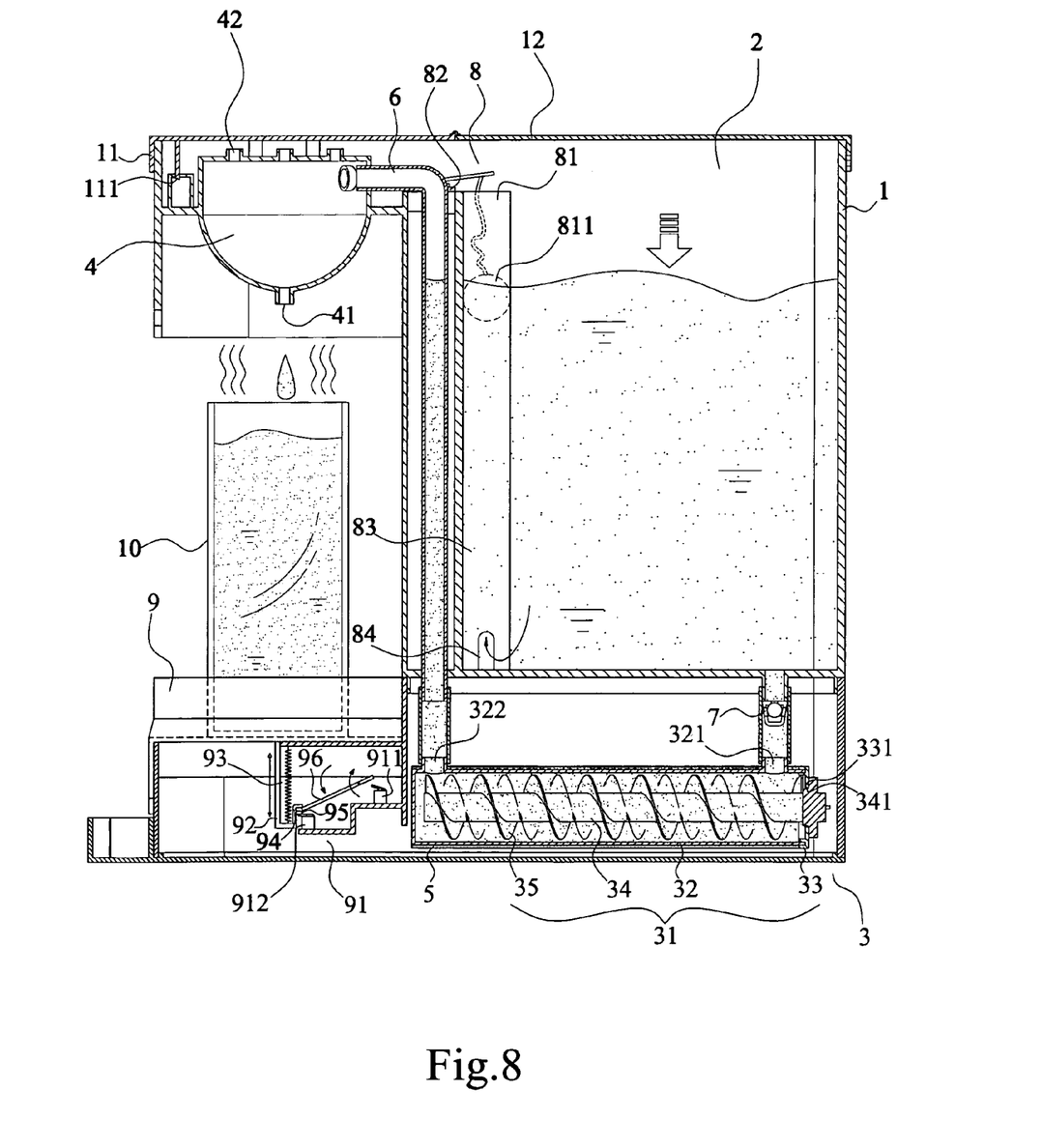
FIG. 8 is a schematic view of the preferred embodiment of the present invention after the heating procedure.

FIG. 5 is a flow chart of the present invention according the illustration of FIGS. 6-8.

As shown in FIGS. 5-8, the heating process of the embodiment of the present invention is described below:
A. Filled the tank (2) with water (FIG. 6), the float ball rises, loosen the cable (813) and makes the float arm (812) inclines upwardly.
B. The first switch (82) of the liquid level switch (8) is switched on.
C. Power indicator (13) glows, indicating the heating device (31) is switched off.
D. Vessel (10) is placed on the salver (9). Support (92) receives the load and moves downwardly, pulls down the first projection part (94) to intrigue the lever bar (96) (FIG. 7).
E. The second switch (911) of the weight sensor mechanism (91) is intrigued, switching the heating devices (31) on.
F. Heating the hyperthermal electric tubes (34).
G. Water in the vessel (C) reaches the required volume; the support (92) continues to move downwardly until the second projection part reaches the third switch (912).
H. The third switch (912) of the weight sensor mechanism (91) is intrigued, switching the heating devices off (FIG. 8).

When the vessel (C) is removed from the salver (9), the spring (93) retracts the salver (9) to its original position same as the second switch (911) and third switch (913).

What is disclosed above is only the preferred embodiment of the present invention and it is therefore not intended that the present invention be limited to particular embodiment disclosed. It will be understood by those skilled in the art that various equivalent changes may be made depending on specification and drawings of present invention without departing from the scope of the present invention.

What is claim claimed:

1. A potable water heating device comprising: a water machine (1); a tank (2) formed in the left side of said water machine (1); a water boiler (3) coupled with the bottom of said water machine (1); a funnel (4) disposed on the upper area of the right side of said water machine (1); a liquid level switch (8) installed on the inner side of said tank (2); a salver (9) disposed on the right side of said water machine under said funnel (4); and a weight sensor mechanism (91) set in the inner bottom of said salver (9);

wherein said weight sensor mechanism (91) comprising a second switch (911) for switching on the heating mechanism of said boiler (3) and initiating hot water supply; a third switch (912) for switching off the heating mechanism of said boiler (3) and discontinuing hot water supply; a support (92) disposed on the bottom of said salver (9); at least two springs (93) engaged with said support (92), to retract the salver (9) to its original position; a first projection part (94) disposed on one side of said support (92), to control the function of said second switch (911); a second projection part (95) disposed on the same side of said first projection part (92), to control the function of said third switch (912); and a self-restoring lever bar (96), controlled by said first projection part (94) to switch on/off said second switch (911);

wherein said liquid level switch (8) comprising a floating device (81); a first switch (82), controlled by said liquid level switch to switch on/off said heating device (31); a wall (83) to separate said floating device (81) and the tank (2); and a passage (84), disposed on the bottom of said wall (83) to connect the tank (2);

Said potable water heating device is characterized in that: at least one heating device (31) disposed inside said water boiler (3), said heating device (31) consists essentially of a hot-resistant chamber (32) whose one opening is connecting to the tank (2) and the other opening is connecting to the funnel (4); a cap (33) covering one opening of said chamber (32); a hyperthermal electric heating tube (34) whose one end is protruded through said cap (33), disposed axially inside said chamber (32); and a helicoidal baffle (35) disposed on the exterior of said heating tube (34);

wherein said chamber (32) connected to said tank by a water inlet (321) and connected to said funnel (4) by a water outlet (322); a check valve (7) incorporated between said water inlet (321) and the tank (2), to prevent hot water flowing back; and a hot water guide pipe (6) having inverted "L" shape is installed between said water outlet (322) and said funnel (4).

2. A potable water heating device of claim 1, wherein the surface of said chamber (32) is covered with a thermal insulation (5).

3. A potable water heating device of claim 1, wherein said weight sensor mechanism (91) further comprising a pressure switch, which can control the alteration of pressure; and a control device which consists essentially of a data decision IC.

4. A potable water heating device of claim 1, wherein said floating device (81) including a float ball (811) with ballast, disposed inside said wall (83); a float arm (812) disposed on the upper area of the water machine (1), to switch on/off said first switch (82); and a cable (813) to connect said float ball (811) and said float arm (812).

5. A potable water heating device of claim 1, wherein said liquid level switch (8) is a switch which monitors the height of the water surface, to switch on/off said heating device (31) when the water level reaches adequate range.

6. A potable water heating device of claim 1, wherein a left cover (11) is set on the top of said water machine (1) to seal the left side thereof; and a right cover (12) is set next to said left cover (11) to seal the tank (2); pluralities of fixing elements (111) are installed on the bottom of said left cover (11) for affixing said left cover (11) to the water machine (1).

\* \* \* \* \*